United States Patent [19]

Dew et al.

[11] Patent Number: 4,516,263
[45] Date of Patent: May 7, 1985

[54] SPATIALLY INTEGRAL, VIDEO SIGNAL PROCESSOR

[75] Inventors: Brock S. Dew, Newton; Paul Greiff, Wayland, both of Mass.

[73] Assignee: The Charles Stark Draper Laboratory, Inc., Cambridge, Mass.

[21] Appl. No.: 373,620

[22] Filed: Apr. 30, 1982

[51] Int. Cl.³ .................. G06K 9/00; H03H 15/02; G11C 19/14; H01L 27/00
[52] U.S. Cl. .................................. 382/41; 307/238.5; 333/165; 357/24; 357/45; 358/213; 377/62; 382/27; 382/50; 382/65
[58] Field of Search .................................. 382/50-54, 382/65, 68, 27, 41; 358/213, 241, 138, 282, 284; 377/63, 62; 333/165, 166; 307/238.1, 238.2, 238.3, 238.4, 238.5; 357/24, 30; 250/211 J

[56] References Cited

U.S. PATENT DOCUMENTS

| | | | |
|---|---|---|---|
| 3,513,318 | 5/1970 | Birnbaum et al. | 250/214 |
| 3,541,246 | 11/1970 | Goldfischer | 358/125 |
| 4,004,083 | 1/1977 | Norem | 358/125 |
| 4,047,152 | 9/1977 | Giuliano et al. | 382/52 |
| 4,426,629 | 1/1984 | Fouse | 358/213 |

Primary Examiner—Leo H. Boudreau
Attorney, Agent, or Firm—Weingarten, Schurgin, Gagnebin & Hayes

[57] ABSTRACT

A video signal processor, particularly for use in identifying light source position, in which a video signal stream from an image detector is processed directly on a substrate using charge coupled device stored image transfer technology. The video signal is clocked through an array of charge coupled devices in a plurality of closely adjacent channels on a single semiconductor chip in such manner that the pattern of signals stored on the chip in the region of the adjacent channels corresponds to the light source image on the detector. Video signal processing is shared between the chip and external electronics to provide an indication of signal strength (acquisition), signal background, and signal centroiding in both horizontal and vertical axes. Much of the signal processing is provided directly on the chip by segmenting and intercoupling the charge coupled device electrodes in a predetermined pattern. There results a reduction in the amount of interconnection, external electronics and the spatial distribution of the video signal that improves the system immunity to environmental noise and limits weight aloft.

25 Claims, 4 Drawing Figures

SPATIALLY INTEGRAL, VIDEO SIGNAL PROCESSOR

FIELD OF THE INVENTION

The present invention relates to video signal processing.

BACKGROUND OF THE INVENTION

Automatic direction detection for isolated sources of optical radiation such as stars is used in many applications, often in the space environment in which weight and bulk must be kept at a minimum and in which the the presence of radiation and other error sources can present a serious problem. Previous image detectors have utilized an array of charge coupled devices acting as optical sensors and arrayed on a two-dimensional substrate. An image is formed on the substrate that develops a corresponding charge pattern in the charge coupled devices and which may subsequently be clocked off the substrate as a series video signal. The video signal can be applied to a plurality of registers which may be discrete digital components or a line of charge coupled devices themselves.

Typically a plurality of lines of charge coupled devices must be sampled over a substantial number of bits of individual stored signals in order to process the video information for such purposes as detecting the centroid of received image intensity. For this purpose it has been customary in the prior art to use either a long line of charge coupled devices or a plurality of such devices with the video signal fed from the output of one back into the input of the other in order to make accessible at any one instance a number of rows and columns for this signal processing function. It has therefore been common to lead from each charge coupled device in the plural elements a separate electrical lead to an amplifier and subsequent processing electronics so that as each image section passes through the charge coupled devices thus instrumented, the stored signal thereon can be processed and positional information on the stellar image can be determined. Each function requires its own processing electronics and greatly contributes to the bulk of the star sensor system as a whole. In addition, the number of discrete amplifiers and electrical signal leads for each segment in the row and column matrix as well as the distribution of those signals onto diverse charge coupled device elements spreads out the signal for a compact image area into distinct regions which may be subjected to different levels of environmental effects, such as radiation, and therefore contribute a significant error component to the desired signal.

BRIEF SUMMARY OF THE INVENTION

The present invention avoids many of these difficulties by providing a video signal processor for the generation of acquisition, background, and vertical and horizontal centroid information in which a significant portion of the signal processing is achieved directly on a single substrate having the entire video signal being processed located in a spatially confined region, retaining the spatial relationship of the original image. The substrate utilizes a plurality of channels of charge coupled devices which are operated to transfer the video signal from one charge coupled device or signal storage segment to another along the channel. The output of one channel is applied through a delay line, comprising a further set of charge coupled devices on the same substrate, and reapplied to the next adjacent channel. Two or more, typically three, such channels are provided with the delay functions accomplished directly on the substrate achieving delay intervals corresponding to a complete row of video information on the image detector. The plural, adjacent signals thus contain a stored signal pattern corresponding in precise spatial relationship to the original optical image received and stored on the charge coupled devices of the video detector.

The charge coupled devices along the plural adjacent channels are divided into separate function regions for detecting signal defect presence, background levels, signal acquisition, horizontal centroid position and vertical centroid position. In each region the electrodes of the charge coupled devices used for sensing the stored signal are configured and interconnected in a manner to provide a portion of the signal processing for accomplishing these various functions directly on the substrate, the closest channel proximity possible minimizes stray capacitance associated with the electrodes. The acquisition signal, in one embodiment, comprises a center weighted three-by-three matrix of charge coupled storage devices bordered by two, three-by-three, evenly weighted charge coupled device matrices from all of which a single output is provided by individually combining the signal on each matrix's electrodes. These are subsequently differenced by digitizing the signal using an external reference threshold such that an acquisition signal is provided, corrected for background levels, so that only a peaked signal distribution in the acquisition charge coupled device matrix will produce a significant output representing the presence of an image from a unitary light source. Signal defect rejection is provided by a further three-by-three matrix, positioned typically at the front end of the set of signal processing channels and having a center unweighted characteristic in which the center is differenced with the periphery of the three-by-three matrix such that a signal output will occur only in the event of a defect, such as a unitary spike occurring in a single charge coupled device, thus indicating a rejectable signal.

Horizontal centroid measurement is achieved by a four-by-three matrix of charge coupled devices which permits, through the use of an additional pair of differencing amplifiers, detection of the position of the stored image intensity distribution center between three distinct horizontal columns. A separate vertical processing region of the substrate provides a similar function to detect the image distribution between the three vertically disposed channels representing detector rows in the image detector.

In this manner, the various signal processing functions are distributed throughout several different signal processing regions of a length of substrate. The individual signal processing regions, typically a matrix of charge coupled devices, are kept in close physical association, corresponding to the original signal pattern produced by the optical image being detected. Weighting of the various portions of the matrices is achieved by segmenting the pickoff electrode of the charge coupled devices in a corresponding area ratio. In addition, by selectively detecting from the appropriate charge coupled device electrode during shifting or resetting operations the detected signal can represent either a positive or negative magnitude corresponding to the signal level stored. This provides additional signal processing directly on the chip avoiding the use of additional discrete components to provide differencing functions.

The signals detected from the various regions along the channels of charge coupled devices are suitably delayed by successively shorter amounts along the channels. This staggered delay brings into time coincidence the signals provided by the individual function matrices as the stored video signal pattern is transferred down the set of adjacent channels.

The analog signals thus developed are typically encoded into a gray code digital signal for unambiguous signal resolution. Further digital processing provides an indication of whether the individual function signal levels are outside a predetermined signal level range.

BRIEF DESCRIPTION OF THE DRAWING

These and other features of the present invention are more fully setforth below in the accompanying and solely exemplary preferred embodiment and drawing of which.

DETAILED DESCRIPTION

Figure 1:
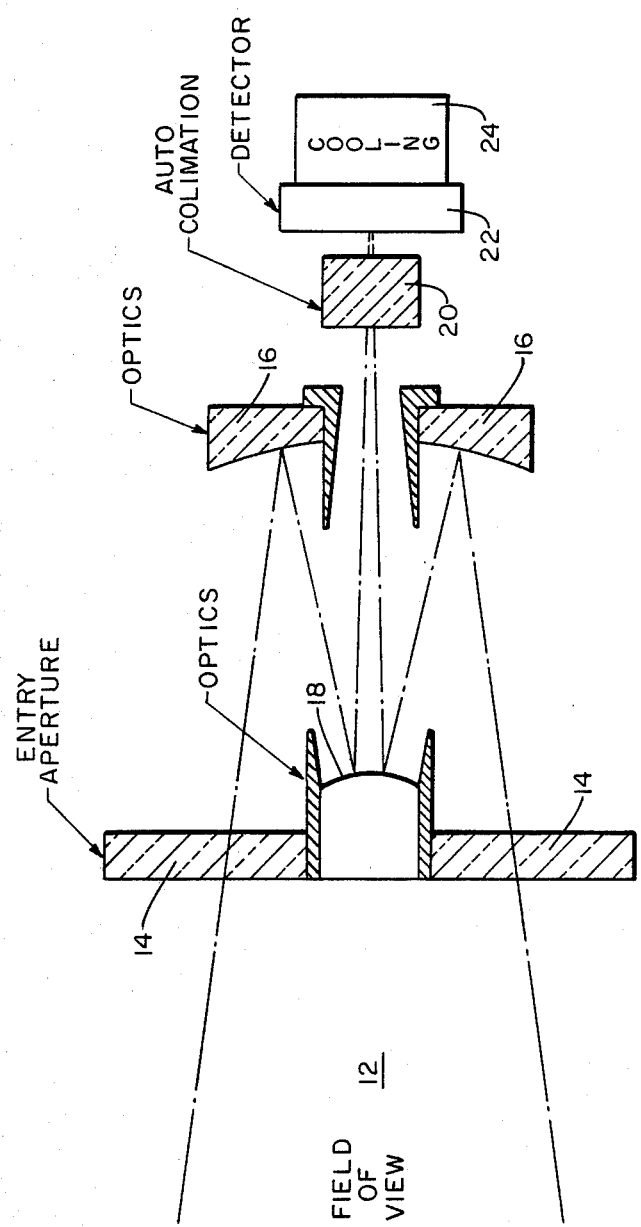
FIG. 1 represents a schematic diagram of an image detector for use in the present invention.

The present invention comtemplates a video signal processor in which a significant portion of signal processing is accomplished on a unitary chip, typically a portion of the detector chip, by passing the stored video signal out of a two-dimensional matrix of video detectors and into a plurality of physically adjacent channels of charge coupled devices. The array of adjacent channels is divided into separate matrices utilized to provide specific signal processing. The stored charge in each device in each matrix is scaled, combined and coupled out of the chip in a manner that accomplishes a significant amount of signal processing directly on the chip. This reduces the amount of external wiring and space consuming electronics. In addition, the close physical proximity of all storage elements for the signals being processed reduces the susceptibility of the system to differential environmental effects that would introduce an error factor in the output. The system of the present invention typically operates with an optical imaging device shown schematically in FIG. 1. As shown there radiation over a field of view 12 enters the imaging device through entry aperture optics 14 which may include a transparent, focusing or nonfocusing lens. Radiation within the field of view is focused and reflected by a first set of reflecting, and focusing optics 16 back toward a second set of reflecting, focusing optics 18 from which it is converged through an autocollimator point source 20 onto the photosensitive surface of a detector unit 22. A cooling element 24 is typically placed adjacent to the detector unit 22.

Figure 2:
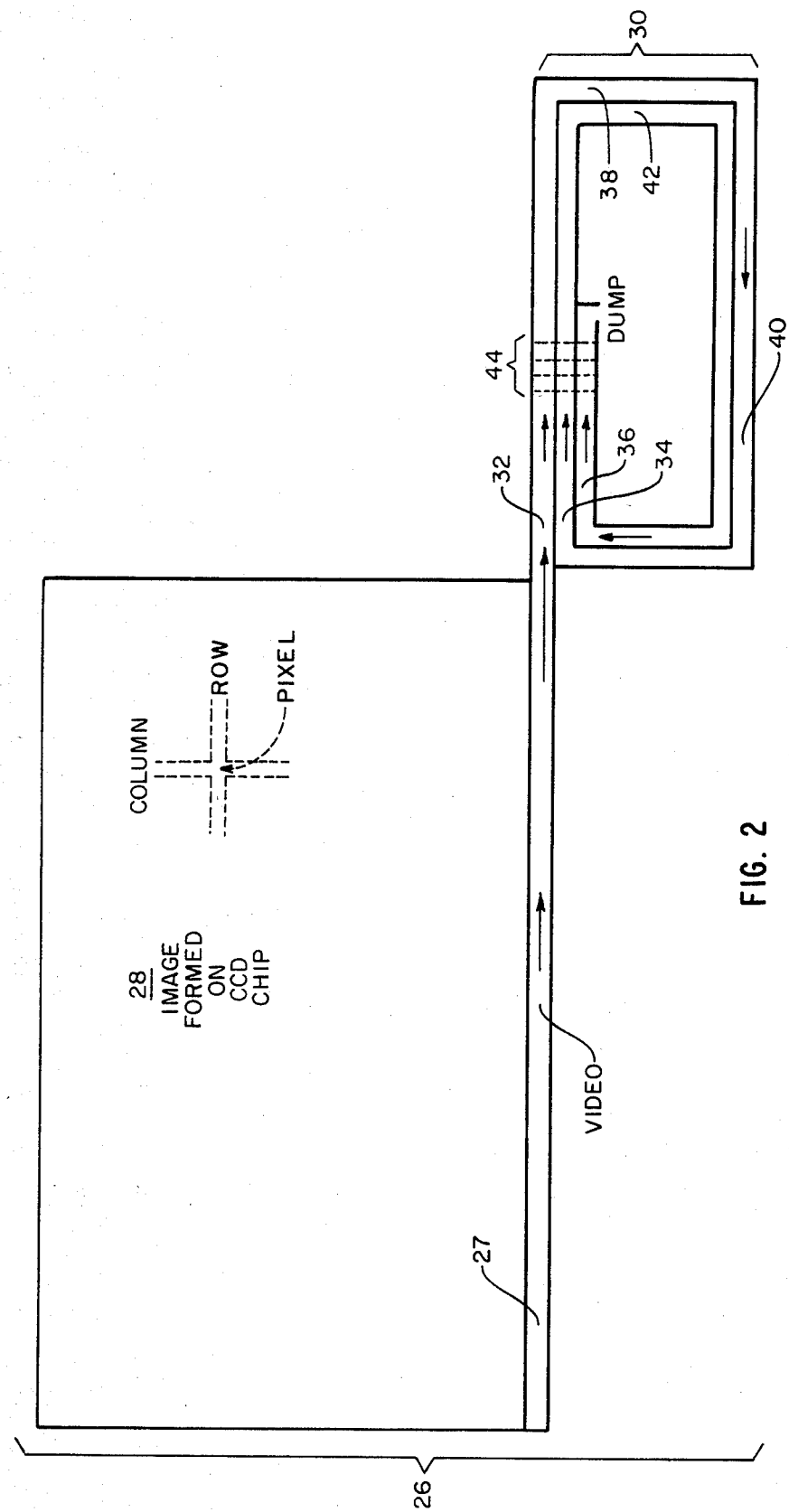
FIG. 2 represents the arrangement of signal flow on a typical charge coupled device, semiconductor chip according to the present invention.

As represented in FIG. 2, the detector unit 22 typically has a semi-conductor chip or substrate 26 with an image region 28 exposed to the radiation from the field of view 12 as focused through the autocollimator 20. The image region 28 typically comprises a row and column matrix of charge coupled device elements each of which forms an individual image pixel. The light level of each pixel is recorded on the chip 26 as a charge level corresponding to the average light intensity received within that pixel. The total pixel capacity for a typical image region 28 is 324-by-324 pixels.

Once the image region 28 has been exposed to a light pattern, the charge coupled devices of each pixel are clocked to provide a video output signal in serial form from a bottom row 27 of registers. To achieve this, each row in region 28 has its charges for each pixel transferred in parallel to the next row, sequentially filling the registers of bottom row 27 as its charge data is serially clock out as the video output. For this purpose, the registers of row 27 are capable of high speed serial charge transfer.

In accordance with the teaching of the present invention, the video signal enters a unitary substrate 30 typically a portion of the substrate 26. Substrate 30 has a set of parallel, adjacent horizontal channels of individual charge coupled device storage segments, shown in typical implementation in FIG. 2 as three parallel adjacent channels 32, 34 and 36. The first channel 32 receives the video signal directly after sequential clocking through the image portion 28 and clocks it down a number of charge coupled device storage segments corresponding to the amount of on-chip signal processing desired, as described in detail below. The output of the channel 32 is integrally formed as the input of a delay line 38 comprising of a sequence of charge coupled devices of sufficient length so that the output of the delay line 38, through a passage 40, to the input of the second channel 34 places each pixel of stored video signal directly in the same relative position to all adjacent pixels that it had in the original image region 28. This pixel is then clocked down the channel 34 maintaining this precise relationship to the surrounding pixels until it exits the channel 34 into a second delay line 42. The delay line 42, again consisting of a sequence of charge coupled devices integral with the semiconductor substrate 30, provides a corresponding delay and reapplies the video information to the third channel 36, maintaining the same pixel alignment as in the original image formed in the region 28. There results a three-by-three matrix 44 of video information within the three channels 32, 34 and 36 which is simultaneously clocked along those channels and represents the identical physical arrangement of the same nine pixels of information originally recorded in the image region 28. As the entire video contents of the image region 28 is clocked out through the channels 32, 34 and 36, each three-by-three pixel (or n-by-m in the general case) is clocked out through the charge coupled device channels 32–36 for signal processing as described below.

Figure 3A:
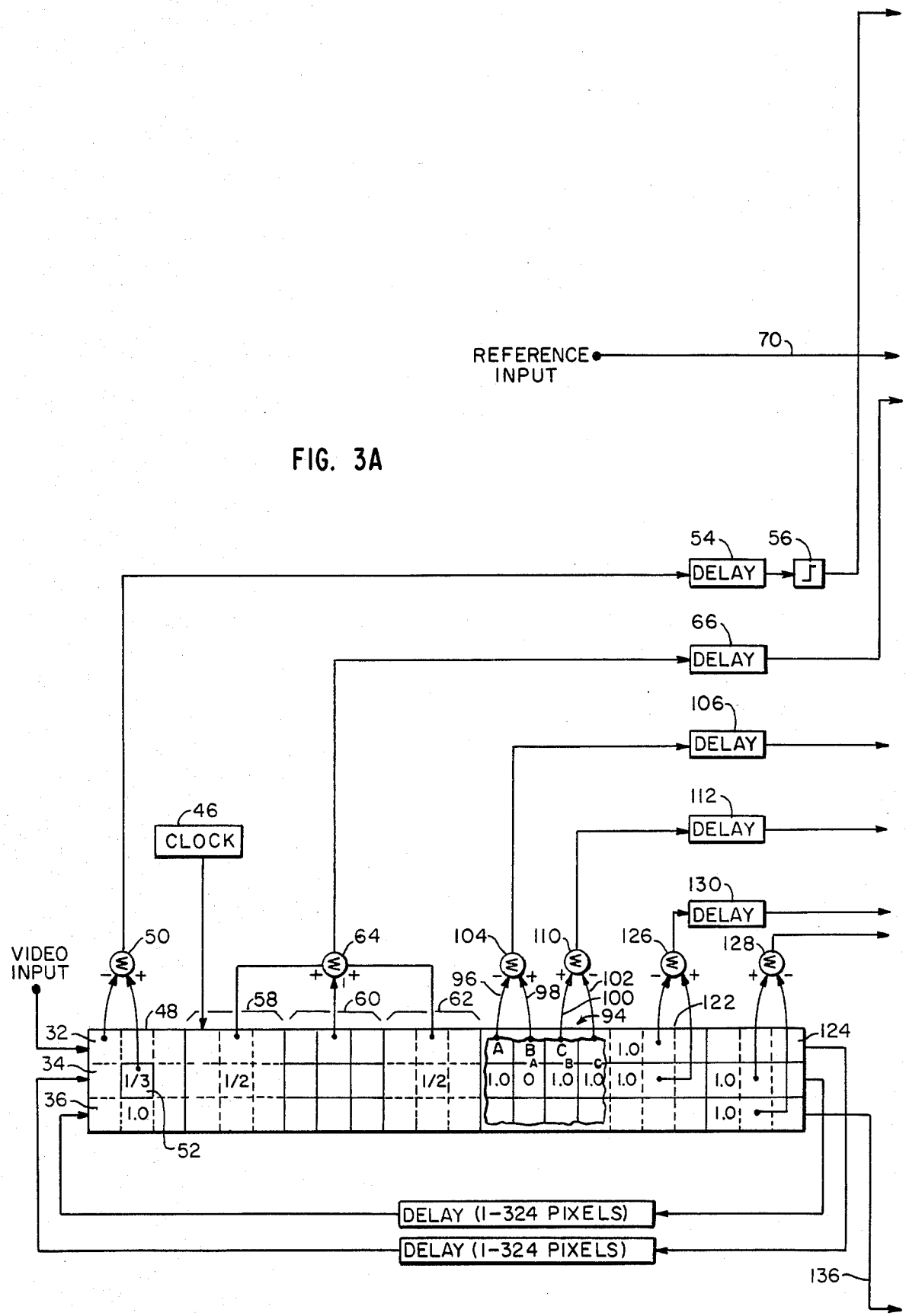
FIG. 3 consisting of FIGS. 3A and 3B is a schematic diagram indicating individual charge coupled device image segment pickoff and on-chip processing in combination with subsequent analog and digital processing according to the present invention.
Figure 3B:
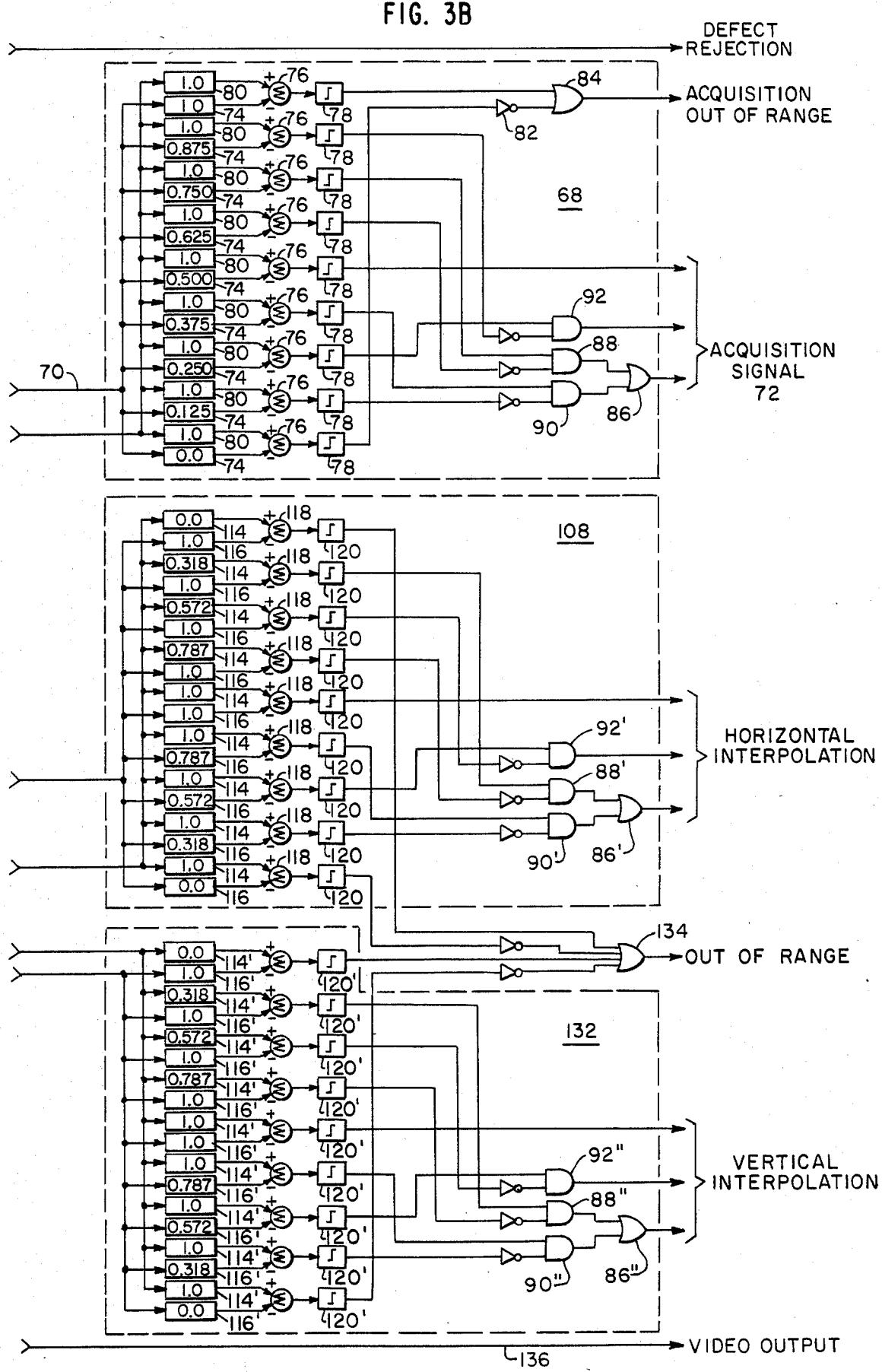

With reference to FIG. 3, the charge coupled device channels 32, 34 and 36 are illustrated as consisting of 22 pixels, each comprising a elementary picture storage segment, which are clocked simultaneously by a clock 46 from left to right. Delay lines 38 and 42 are shown as lumped elements though it is understood that they preferably are formulated on the same semiconductor chip containing the three channels 32, 34 and 36 as a unitary, spatially integrated package of picture information.

In the preferred embodiment of FIG. 3, the first three pixels in each of the channels 32–36 are denoted as a signal defect rejection region 48. The sampling electrodes from the eight peripheral pixels in the three-by-three matrix of the defect rejection region 48 are combined in unity weighting and applied to the inverting input of a summing amplifier 50. The central pixel 52 is weighted by a factor of one third and applied to the non-inverting input of the amplifier 50. In this manner signal processing is provided directly on the substrate having the channels 32–36 by identifying separately the central and peripheral pixels and providing weighting thereto. Typically, weighting is achieved by segmenting the sampling electrodes of each charge coupled device forming each of the pixels in accordance with the weighting desired. The charge will be transferred through the electrodes in proportion to their size and therefore by segmenting the electrodes appropriately and by coupling the charge signal from one segment in each pixel, relative scaling can be provided directly within the three-by-three matrix 48. In this and subsequent on-chip processing, the channels are in closest proximity to minimize stray capacitance associated with the electrodes.

The output of the amplifier 50 is applied through a nineteen pixel delay circuit 54 to a comparator 56 to provide a binary value output bit for signal defect rejection purposes. The nineteen pixel delay 54 is used so that the signal defect rejection bit is provided in time coincidence with the data for the same three-by-three matrix of information from all other processing matrices in the channels 32–36.

The functioning provided on the chip in the matrix 48 is to suppress the value of the central pixel 52 relative to the value of the eight surrounding pixels so that only a defect, such as an extremely high value noise spike, will pass the amplifier 50 and achieve state switching of the comparator 56 to set the defect rejection output at the binary one level. In this manner, the on-chip matrix 48 contributes a significant amount of signal processing.

The next nine-by-three pixel matrix is divided into three, three-by-three matrices 58, 60 and 62. The matrices 58 and 62 provide background detection while the central matrix 60 provides acquisition detection. The pickoff electrodes of the nine pixels in the matrix 60 are segmented to provide a center weighting in the relative values of 0.388: 0.110: 0.042 for the central, edge central, and edge end pixels respectively, although other values may be used depending on star shape. These electrodes are applied in common to the summing input of a summing amplifier 64. The background matrices 58 and 62 are similarly weighted in their pickoff but each at one half the level of the weighting of the matrix 60. The pickoff electrodes from the charge coupled devices of each pixel of the matrices 58 and 62 are applied to further summing inputs of the amplifier 64. To provide a negating function for the background matrices 58 and 62, the outputs of the individual charge coupled devices are taken from the reset electrodes, resulting in a substraction value applied to the summing amplifier 64, compared to the charge addition value supplied from the matrix 60. In this manner, a homogeneous signal throughout all pixels of the matrices 58, 60, and 62 will produce a zero output from the amplifier 64. Thus the individual charge coupled devices and their sampling electrodes are operated in a signal processing manner to provide not only signal weighting but also inversion to accomplish, in a single summing amplifier 64, a differencing function.

The output of the amplifier 64 is applied through a 13 pixel delay circuit 66 to an acquisition digitizing circuit 68 along with a reference value input 70. The digital output 72 of the digitizer circuit 68 thus represents the value of the acquisition signal, corrected for background, relative to the reference value on input 70. The reference on input 70 is applied through a first set of nine attenuators 74 which have amplification values proceeding progressively from 1.0 to 0.0 in 0.125 steps. The output of each of the attenuators 74 is respectively applied to nine corresponding summing amplifiers 76 on inverting inputs thereof with the output of each of the summing amplifiers 76 respectively applied to nine corresponding comparators 78. Comparators 78 produce a binary zero or one output corresponding to the level of the output of the amplifiers 76 relative to the comparator's threshold. The output of the delay circuit 66 from the acquisition matrices on the chip, is applied through a further set of nine attenuators 80 all having no attenuation (an amplification of one). The outputs of the attenuators 80 are respectively applied to non-inverting inputs of corresponding amplifiers 76.

The outputs of the first and last comparators 78 are applied directly, and through an inverter 82, respectively, to an OR gate 84 to provide an out of range output for the acquisition signal, indicating that the magnitude of the acquisition signal exceeds a predetermined limit encompassing the reference input.

The output of the specific comparator 78 that receives the half attenuated reference signal provides the most significant digital output bit. The least significant output bit is provided from an OR gate 86 having two inputs, one from each of respective AND gates 88 and 90. The AND gate 88 ANDS the output of the third comparator 78 with the inverted output of the fourth comparator 78, while the AND gate 90 ANDS the output of the sixth comparator 78 with the inverted output of the eighth comparator 78. The middle bit is provided as the output of an AND gate 92 which ANDS the output of the seventh comparator 78 with the inverted output of the second comparator 78. The specific digital encoding provides a gray scale which eliminates any ambiguities in the digitization.

The next four pixel elements in the channels 32–36 comprise a four-by-three matrix 94 used for providing an indication of the distribution of stored image intensity in the horizontal direction, along the direction that the pixels travel in the channels 32–36. To this purpose the subtraction reset electrodes of the charge coupled devices in each vertical column of the four pixels along the channels 32–36 are combined to provide a series of four outputs 96, 98, 100, and 102. The output lines 96 and 98 are differenced in a differential amplifier 104 and applied through a seven pixel delay circuit 106 to a horizontal interpolation digitizing circuit 108.

The signals on the lines 100 and 102 are differenced in a differential amplifier 110 and applied through a six pixel delay circuit 112, also to the digitizing circuit 108. The matrix 94 essentially provides a three pixel analysis of the horizontal intensity distribution across the three pixels which in a first time interval occur in the first three pixels of the matrix 94, and in the next time interval, a one pixel shift later as represented by the delay difference between the circuits 106 and 112, will occur in the last three pixels of the matrix 94.

The digitizing circuit 108 comprises a set of nine attenuators 114 which respond to the output of the seven pixel delay circuit 106. Their amplification ranges from zero in the first attenuator 114 in 0.318 steps to 1.0 in the fifth and subsequent attenuators 114. The output of the six pixel delay circuit 112 is applied to a set of attenuators 116 which range in amplification from a factor of one in the first five attenuators to zero, in 0.318 steps, thereafter. A set of seven differential amplifiers 118 are provided to respond on non-inverting inputs to the output of corresponding attenuators 114 and on inverting inputs to the ouput of corresponding attenuators 116. The output of each amplifier 118 is applied to corresponding comparators 120. The outputs of the comparators 120 are digitally processed by a set of AND gates 92′, 88′, and 90′ and OR gate 86′ identical to the AND gates 92, 88, and 90 and OR gate 86 is used in the digitizing circuit 68 to provide the most significant, least significant and intermediate bits of the horizontal interpolation signal.

The remaining six-by-three bit matrix in the channels 32–36 is divided into two three-by-three matrices 122 and 124. In the matrix 122, the substraction reset sensing electrodes of the charge coupled devices in the pixels of the channels 32 and 34 are provided as separate outputs to respective inverting and noninverting inputs of a differential amplifier 126. In matrix 124, the subtraction electrodes for all of the pixels in the channels 34 and 36 respectively are provided to non-inverting and inverting inputs of a differential amplifier 128. The output of the amplifier 126 is provided through a three pixel delay circuit 130 so that, in time coincidence, the output of the delay circuit 130 and amplifier 128 represent comparisons between the central channel 34 and respective top and bottom channels 32 and 36 indicating a vertical distribution in analog magnitude, for the sensed light source information in the basic three-by-three pixel matrix travelling down the channels 32–36.

The outputs of the amplifier 128 and of the delay circuit 130 are applied to a digitizing circuit 132. In particular, the output of the delay circuit 130 is applied to a set of nine attenuators 114′ which are identical in scaling value to the attenuators 114 of the digitizing circuit 108. Similarly the output of the amplifier 128 is applied to a set of nine attenuators 116′ which also correspond to the attenuators 116 in the digitizing circuit 108. The digitizing circuit 132 also includes a set of nine differential amplifiers 118′ and nine comparators 120′ corresponding to their counterparts in the digitizing circuit 132. Similar AND gates 92″, 88″, and, 90″ as well as OR gate 86″ are also provided as a part of the digitizing circuit 132 to provide vertical interpolation in digital binary grey code form as a set of three, most significant, least significant and intermediate bits.

Combined horizontal and vertical out of range data is provided by a four input OR gate 134 which receives the output of the first comparators 120′ and 120″ in the digitizing circuits 108 and 132 as well as the inverted output of the last comparators 120′ and 120″ in the digitizing circuits 108 and 132.

The output from the last charge coupled device in the channel 36 may be provided as a video output signal on a line 136.

The above description is of a preferred embodiment for utilizing on-chip signal processing to reduce the degree of electronics and their susceptibility to error in a optical sensing and positioning device such as a star tracker. The actual scope of the invention is to be determined solely from the following claims.

What is claimed is:

1. A spatially integral video signal processor unit comprising:
  a unitary substrate;
  a plurality of signal transfer channels for transferring video signals originating from detection of an optical image along said substrate;
  means for applying said video signaLs to one of said signal transfer channels;
  said plurality of channels being adjacent each other on said substrate and divided into individual signal storage elements;
  said signal storage elements adapted to transfer the signal stored thereby from element to element along each channel;
  said substrate further including means for applying the output of one channel after suitable delay to the input of an adjacent channel to define a single elongated signal path through said plurality of signal transfer channels during application of said video signals to said one of said signal transfer channels whereby the signaLs stored in said plural adjacent channels represent the detected optical image in original two-dimensional relationship;
  means on said substrate for developing a signal representative of a predetermined function of at least a portion of the signals stored in adjacent elements of adjacent channels in real time during application of said video signals.

2. The unit of claim 1, wherein said substrate comprises a semiconductor substrate.

3. The unit of claim 2, wherein said storage elements comprise charge coupled devices.

4. The unit of claim 1 wherein:
  a plurality of adjacent storage elements in adjacent locations in said plural channels comprise an acquisition array;
  said means for developing a signal comprises means for developing a signal representing the combined charge stored in the storage elements of said acquisition array.

5. The unit of claim 4 wherein:
  said acquisition array comprises a central acquisition window having a matrix of said storage elements across said plurality of channels and a matrix of storage elements on either side of said acquisition window adapted for background measurement;
  means are provided for differencing the combined signal stored in the storage elements defined by said background measurement matrices with the combined signal stored in the storage elements defined by the acquisition window matrix.

6. The unit of claim 5, wherein said differencing means is adapted to provide substantially no output in the absence of a signal pattern in the storage elements of said acquisition array corresponding to a light source image.

7. The unit of claim 5 wherein:
  the signal developing means includes means for developing a center weighted signal from the combination of storage signals in said elements in said acquisition window matrix.

8. The unit of claim 4 further including means for encoding said developed signal into a digital representation.

9. The unit of claim 8 wherein said encoding means includes means for indicating whether the developed signal exceeds a predetermined signal range.

10. The unit of claim 1 further including:
  a centroid measuring array comprising plural adjacent elements in adjacent locations in said plural channels;

means associated with said signal developing means including means for developing a signal representing a weighted combination of the signal stored in said elements of said centroid measuring array to provide an indication of the center of image intensity distributed among the storage elements of said centroid measuring array.

11. The unit of claim 10 wherein:
said centroid measuring array includes a horizontal centroid measuring matrix;
means are provided associated with said signal developing means for indicating the center of image intensity distribution horizontally in the direction of said plural channels.

12. The unit claim 11 wherein:
said horizontal centroid measuring matrix comprises a plurality of storage elements in each of said plural channels;
said detecting means includes means for combining the signal stored in each element position across all of said channels; and
means are provided for developing a signal representative of the horizontal distribution of the thus combined signals for each element position to give an indication of the center of the distribution of the storage signals horizontally throughout said centroid measuring region.

13. The unit of claim 11 further including means for encoding the horizontal distribution signal to provide a digital representation thereof.

14. The unit of claim 13 wherein said encoding means includes means for providing an indication of whether said developed signal is outside a predetermined signal range.

15. The unit of claim 10 wherein:
said centroid measuring array includes a vertical centroid measuring matrix comprising a plurality of storage elements in each channel in adjacent portions of said plural channels;
means are provided responsive to said developed signal to provide a signal indicating the vertical distribution of stored signal intensity between channels.

16. The unit of claim 15 wherein:
said signal developing means includes means for combining the signals stored in the channels of said vertical centroid measuring matrix;
means are provided responsive to the combined signals from each of said plural channels to provide a signal indicative of the distribution of stored signal intensity vertically from one channel to the other across the plural channels.

17. The unit of claim 15 further including means for encoding the vertical distribution signal to provide a digital representation thereof.

18. The unit of claims 13 or 17 wherein said encoding means further includes means for providing an indication when the developed signal exceeds a predetermined signal range.

19. The unit of claim 1 wherein:
a plurality of storage elements adjacent to each other in each of said plural channels and in adjacent portions of said plural channels define a signal defect rejection matrix;
said means for developing a signal includes means for developing a first signal representing the combination of signals stored on the peripheral elements of said signal defect rejection matrix and a second signal representing an attenuated version of the signal stored at the center of that matrix; and
means are provided responsive to said first and second signals to define signal defect presence.

20. The unit of claim 3 wherein each charge coupled device storage element includes at least one electrode:
said signal developing means includes means for combining the signal stored on plurality of said electrodes;
said electrodes being segmented to provide a weighting function.

21. The unit of claim 1 wherein said plurality of channels comprise three channels.

22. The unit of claim 1 further including:
a charge coupled deviced optical image detector;
means for forming an image on said image detector;
said image detector comprising a plurality of parallel lines each having plural image intensity detecting elements; and
means for transferring the image stored on said charge coupled devices serially from said image detector to provide said video signal.

23. The unit of claim 22 further including means for cooling said imae detector.

24. The unit of claim 22 wherein said substrate is formed as a portion of said image detector.

25. The unit of claim 1 wherein said signal developing means includes channel located electrodes, configured by proximity of said channels, to minimize stray capacitance associated with said electrodes.

* * * * *